United States Patent
Natsume et al.

(10) Patent No.: US 7,271,761 B2
(45) Date of Patent: Sep. 18, 2007

(54) DISTANCE CALCULATING METHOD AND SYSTEM

(75) Inventors: Kazuma Natsume, Kariya (JP); Hiroshi Hazumi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 10/690,843

(22) Filed: Oct. 23, 2003

(65) Prior Publication Data

US 2004/0125010 A1 Jul. 1, 2004

(30) Foreign Application Priority Data

Oct. 25, 2002 (JP) .................................. 2002-311386

(51) Int. Cl.
*G01S 13/34* (2006.01)
*G01S 13/93* (2006.01)

(52) U.S. Cl. .................... 342/128; 342/70; 342/118; 342/195; 342/196

(58) Field of Classification Search ......... 342/192–197, 342/70–73, 104, 109, 118, 128–133, 175; 367/99, 101, 102; 701/300, 301
See application file for complete search history.

(56) References Cited

U.S. PATENT DOCUMENTS

| 5,619,208 A | * | 4/1997 | Tamatsu et al. | ........... 342/70 |
| 5,625,362 A | * | 4/1997 | Richardson | ........... 342/70 |
| 5,920,280 A | * | 7/1999 | Okada et al. | ........... 342/109 |
| 5,963,509 A | * | 10/1999 | Lindmuller et al. | ........ 367/102 |
| 6,788,247 B2 | | 9/2004 | Mitsumoto et al. | |

FOREIGN PATENT DOCUMENTS

| JP | 8-94749 | 4/1996 |
| JP | 9-90026 | 4/1997 |
| JP | 11-271432 | 10/1999 |
| WO | WO 02/067010 A1 | 8/2002 |

OTHER PUBLICATIONS

Notification of reasons for rejection in corresponding Japanese application No. 2002-311386 dated Mar. 13, 2007 (copy and translation enclosed).

* cited by examiner

*Primary Examiner*—Bernarr E. Gregory
(74) *Attorney, Agent, or Firm*—Posz Law Group, PLC

(57) ABSTRACT

In a system, a frequency-modulating unit is configured to frequency-modulate a radar wave signal within a predetermined frequency modulation range from bottom to top so that a frequency of the frequency-modulated radar wave changes in time. The rate of frequency change of the radar wave signal in time is set to F0/Tf. The F0 represents a center frequency in the frequency modulation range. The Tf represents the predetermined constant time. A mixing unit is configured to mix the transmitted frequency-modulated radar wave signal and the reflection signal to obtain a beat signal. The beat signal is based on a frequency difference between a frequency of the transmitted radar wave signal and that of the reflection signal. A sweeping unit is configured to sweep the beat signal within the frequency modulation range from one of the bottom and the top to the other thereof to obtain a frequency component of the beat signal. An obtaining unit is configured to obtain the prediction distance based on a relationship between the frequency component of the beat signal and the prediction distance.

17 Claims, 10 Drawing Sheets

DISTANCE CALCULATING METHOD AND SYSTEM

BACKGROUND OF THE INVENTION

The present invention relates to a method and a system for transmitting frequency-modulated radar waves to targets to calculate the distances to the targets.

As conventional systems of transmitting frequency-modulated radar waves to a target and receiving reflection waves therefrom to calculate the distance to the target, FMCW (Frequency Modulated Continuous Wave) radar systems have been known. The FMCW radar system is referred to simply as "FMCW radar" hereinafter.

One of the conventional FMCW radars has been disclosed in Japanese Patent Publication NO. H11-271432.

In the Patent Publication, the FMCW radar is configured to transmit a radar wave signal whose frequency, as shown in FIG. 11, is modulated so that the frequency is linearly repeatedly fluctuated like a triangular waveform with respect to time. The FMCW radar is configured to receive the radar wave signal that is reflected from the target and to mix the transmitted radar wave signal Ss1 with the received signal Sr1, thereby obtaining a beat signal having a frequency component corresponding to a difference between the transmitting frequency of the radar wave signal Ss1 and the received signal Sr1.

The FMCW radar is configured to obtain information related to the target according to the obtained beat signal.

Concretely, the FMCW radar executes the Fast Fourier Transformation (FFT) on the frequency components of the beat signal that correspond to a rising modulation period (sweep time ST) in which the frequency of the radar signal increases (rises), and on the remained frequency components thereof that correspond to a falling modulation period (sweep time ST) in which the frequency of the radar signal decreases (falls), thereby obtaining a power spectrum of the beat signal in each of the rising and falling modulation periods.

The FMCW radar samples a peak frequency component in each of the power spectrums and combines the sampled peak frequency components to obtain a pair of peak frequency components.

As shown in FIG. 11, assuming that one of the paired peak frequency components corresponding to the rising modulation period has a frequency of fb1, the other thereof corresponding to the falling modulation period has that of fb2, and the target moves at a relative velocity V over zero with respect to the FMCW radar, the FMCW radar applies the frequencies fb1 and fb2 to the following equations (1) to (4), thereby obtaining a distance (range) R1 from the FMCW radar to the target and/or a relative velocity V1 of the target:

$$fr1 = \frac{fb1 + fb2}{2} \quad (1)$$

$$fd1 = \frac{fb1 - fb2}{2} \quad (2)$$

$$R1 = \frac{c \cdot fr1}{4 \cdot fm1 \cdot \Delta F1} \quad (3)$$

$$V1 = \frac{c \cdot fd1}{2 \cdot F01} \quad (4)$$

where the fr1 represents a delay frequency from which the radar wave signal Ss1 is transmitted to which the reflected signal Sr1 is received, the ΔF1 represents a modulation width of the radar wave signal, the F01 represents a center frequency of the radar wave signal, the fd1 represents a Doppler frequency at which the frequency fb2 is shifted with respect to the frequency fb1, the c represents velocity of light, and the 1/fm represents each of the rising and falling modulation periods. Incidentally, the Tr1 in FIG. 6A represents a delay time from which the radar wave signal Ss is transmitted to which the reflected signal Sr1 is received.

In cases where a plurality of targets exist around the FMCW radar, the FMCW radar samples a plurality of first peak frequency components in the plurality of power spectrums corresponding to the rising modulation periods of the plurality of targets, and a plurality of second peak frequency components in the plurality of power spectrums corresponding to the falling modulation periods thereof.

Then, the FMCW radar combines every first peak frequency component with every second peak frequency component to obtain every pair of the first peak frequency components and second peak frequency components. The FMCW radar computes every distance R1 and/or every relative velocity V1 on the basis of the every pair of the first and second peak frequency components.

The FMCW radar repeatedly executes the above processes of obtaining every distance R1 and/or every relative velocity V1 on the basis of the every pair of the first and second peak frequency components.

Then, the FMCW radar decides that each of the extracted distances R1 and relative velocities V1 is obtained by correctly combining each of the first peak frequency components of each of the targets with each of the second peak frequency components of each of the same.

The above combining processes and the extracting processes, however, must require the enormous amount of computing.

In addition, the FMCW radar must obtain each of the beat signals in each of the rising modulation period and the falling modulation period so that the enormous amount of time must be required for collecting the beat signals.

The above problems may make difficult the installation of the FMCW radar in a vehicle.

That is, when installing the FMCW radar in a vehicle, it is necessary to detect each target around the vehicle in the shortest possible time so as to predict a probability that the vehicle will collide with each target, to avoid the collision of the vehicle and each target and so on.

However, because the FMCW radar requires the enormous amount of computing and the enormous amount of time to detect each target, it may be hard to detect each target within the shortest possible time required for predicting the probability that the vehicle will collide with each target so as to avoid the collision of the vehicle and each target and so on.

SUMMARY OF THE INVENTION

The present invention is made on the background.

Accordingly, it is an object of the present invention to provide a method and a system that are capable of detecting a target with a small amount of computing.

According to another aspect of the present invention, there is provided a method of calculating a prediction distance from a reference object to a target after predetermined constant time from a current state that the reference object and the target have a positional relationship therebetween, the method comprising: frequency-modulating a radar wave signal within a predetermined frequency modulation range from bottom to top so that a frequency of the frequency-modulated radar wave changes in time, a rate of frequency change of the radar wave signal in time being set to F0/Tf, the F0 representing a center frequency in the frequency modulation range, the Tf representing the predetermined constant time; mixing the frequency-modulated radar wave signal transmitted from the reference object and a reflection signal to obtain a beat signal, the reflection signal being based on the transmitted radar wave signal reflected from the target, the beat signal being based on a frequency difference between a frequency of the transmitted radar wave signal and that of the reflection signal; sweeping the beat signal within the frequency modulation range from one of the bottom and the top to the other thereof to obtain a frequency component of the beat signal; and obtaining the prediction distance based on a relationship between the frequency component of the beat signal and the prediction distance.

According to another aspect of the present invention, there is provided a method of calculating a current distance from a reference object to a target, and a prediction distance from the reference object to the target after predetermined constant time from a current state that the reference object and the target have the current distance, the method comprising: first frequency-modulating a first radar wave signal so that a frequency of the frequency-modulated first radar wave alternately increases and decreases in time; first mixing the frequency-modulated first radar wave signal transmitted from the reference object and a first reflection signal to obtain a first beat signal, the first reflection signal being based on the transmitted first radar wave signal reflected from the target, the first beat signal being based on a frequency difference between a frequency of the transmitted first radar wave signal and that of the first reflection signal; first sweeping the first beat signal within a rising modulation period in which the frequency of the first radar signal increases and within a falling modulation period in which the frequency thereof decreases, respectively, to obtain a pair of frequency components of the first beat signal corresponding to each of the rising modulation period and the falling modulation period; first obtaining the current distance based on the pair of frequency components of the beat signal; second frequency-modulating a second radar wave signal within a predetermined frequency modulation range from bottom to top so that a frequency of the frequency-modulated second radar wave changes in time, a rate of frequency change of the second radar wave signal in time being set to F0/Tf, the F0 representing a center frequency in the frequency modulation range, the Tf representing the predetermined constant time; second mixing the frequency-modulated second radar wave signal transmitted from the reference object and a second reflection signal to obtain a second beat signal, the second reflection signal being based on the transmitted second radar wave signal reflected from the target, the second beat signal being based on a frequency difference between a frequency of the transmitted second radar wave signal and that of the second reflection signal; second sweeping the second beat signal within the frequency modulation range from one of the bottom and the top to the other thereof to obtain a frequency component of the second beat signal; and second obtaining the prediction distance based on a relationship between the frequency component of the second beat signal and the prediction distance.

According to further aspect of the present invention, there is provided a system for calculating a prediction distance from the own system to a target after predetermined constant time from a current state that the reference object and the target have a positional relationship therebetween, the system comprising: a frequency-modulating unit configured to frequency-modulate a radar wave signal within a predetermined frequency modulation range from bottom to top so that a frequency of the frequency-modulated radar wave changes in time, a rate of frequency change of the radar wave signal in time being set to F0/Tf, the F0 representing a center frequency in the frequency modulation range, the Tf representing the predetermined constant time; a transmitting unit configured to transmit the frequency-modulated radar wave signal; a receiving unit configured to receive a reflection signal, the reflection signal being based on the transmitted radar wave signal reflected from the target; a mixing unit configured to mix the transmitted frequency-modulated radar wave signal and the reflection signal to obtain a beat signal, the beat signal being based on a frequency difference between a frequency of the transmitted radar wave signal and that of the reflection signal; a sweeping unit configured to sweep the beat signal within the frequency modulation range from one of the bottom and the top to the other thereof to obtain a frequency component of the beat signal; and an obtaining unit configured to obtain the prediction distance based on a relationship between the frequency component of the beat signal and the prediction distance.

According to still further aspect of the present invention, there is provided a system for calculating a current distance from the own system to a target, and a prediction distance from the own system to the target after predetermined constant time from a current state that the own system and the target have the current distance, the system comprising: a first frequency-modulating unit configured to frequency-modulate a first radar wave signal so that a frequency of the frequency-modulated first radar wave alternately increases and decreases in time; a first transmitting unit configured to transmit the frequency-modulated first radar wave signal; a first receiving unit configured to receive a first reflection signal, the first reflection signal being based on the transmitted first radar wave signal reflected from the target; a first mixing unit configured to mix the transmitted frequency-modulated first radar wave signal and the first reflection signal to obtain a first beat signal, the first beat signal being based on a frequency difference between a frequency of the transmitted first radar wave signal and that of the first reflection signal; a first sweeping unit configured to sweep the first beat signal within a rising modulation period in which the frequency of the first radar signal increases and within a falling modulation period in which the frequency thereof decreases, respectively, to obtain a pair of frequency components of the first beat signal corresponding to each of the rising modulation period and the falling modulation period; a first obtaining unit configured to obtain the current distance based on the pair of frequency components of the beat signal; a second frequency-modulating unit configured to frequency-modulate a second radar wave signal within a predetermined frequency modulation range from bottom to top so that a frequency of the frequency-modulated second radar wave changes in time, a rate of frequency change of the second radar wave signal in time being set to F0/Tf, the F0 representing a center frequency in the frequency modulation range, the Tf representing the predetermined constant time; a second transmitting unit configured to transmit the frequency-modulated second radar wave signal; a second receiving unit configured to receive a second reflection signal, the second reflection signal being based on the transmitted second radar wave signal reflected from the target; a second mixing unit configured to mix the transmitted frequency-modulated second radar wave signal and the second reflection signal to obtain a second beat signal, the second beat signal being based on a frequency difference between a frequency of the transmitted second radar wave signal and that of the second reflection signal; a second sweeping unit configured to sweep the second beat signal within the frequency modulation range from one of the bottom and the top to the other thereof to obtain a frequency component of the second beat signal; and a second obtaining unit configured to obtain the prediction distance based on a relationship between the frequency component of the second beat signal and the prediction distance.

According to still further aspect of the present invention, there is provided a program product that is readable by a signal processing unit for calculating a prediction distance from a reference object to a target after predetermined constant time from a current state that the reference object and the target have a positional relationship therebetween, in which the signal processing unit is installed in the reference object and is communicable with a frequency-modulating unit installed in the reference object, the program product comprising: means for causing the signal processing unit to control the frequency-modulating unit so that the frequency-modulating unit frequency-modulates a radar wave signal within a predetermined frequency modulation range from bottom to top so that a frequency of the frequency-modulated radar wave changes in time, a rate of frequency change of the radar wave signal in time being set to F0/Tf, the F0 representing a center frequency in the frequency modulation range, the Tf representing the predetermined constant time; when the frequency-modulated radar wave signal transmitted from the reference object and reflected from the target is received as a reflection signal, and the reflection signal is mixed with the transmitted radar wave signal to obtain a beat signal that is based on a frequency difference between a frequency of the transmitted radar wave signal and that of the reflection signal, means for causing the signal processing unit to sweep the beat signal within the frequency modulation range from one of the bottom and the top to the other thereof to obtain a frequency component of the beat signal; and means for causing the signal processing unit to obtain the prediction distance based on a relationship between the frequency component of the beat signal and the prediction distance.

BRIEF DESCRIPTION OF THE DRAWINGS

Other objects and aspects of the invention will become apparent from the following description of an embodiment with reference to the accompanying drawings in which.

DETAILED DESCRIPTION OF EMBODIMENTS OF THE INVENTION

An embodiment of the invention will be described hereinafter with reference to the accompanying drawings.

Figure 1:
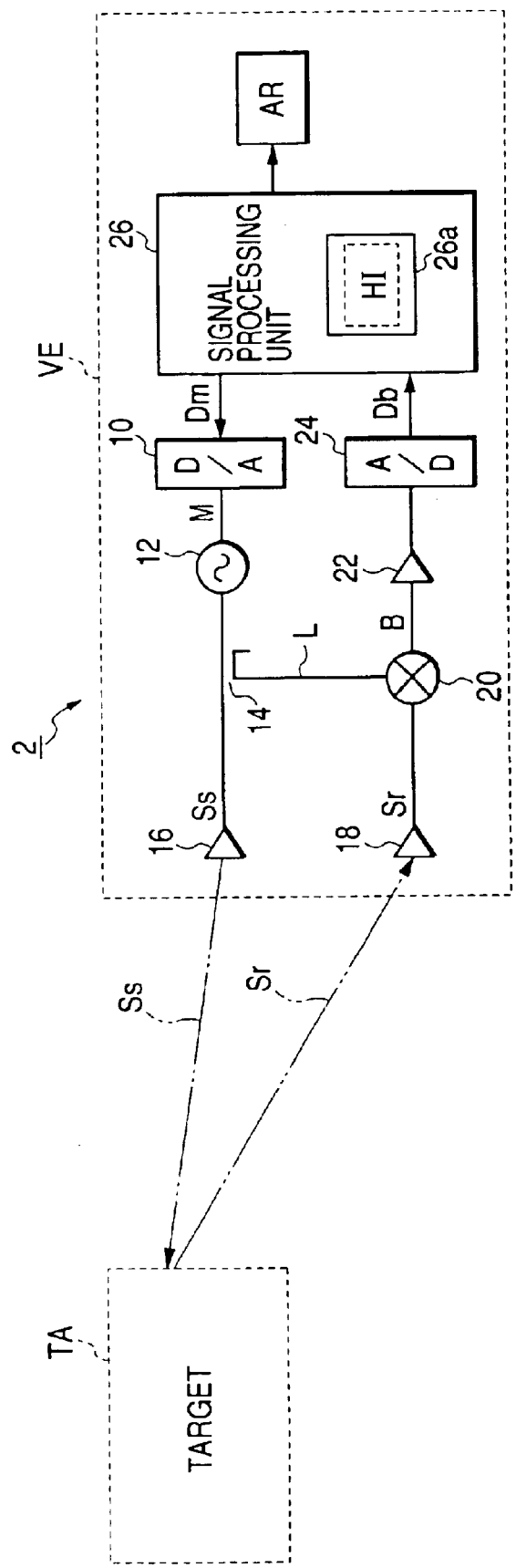
FIG. 1 illustrates a block diagram showing an overall structure of a radar system installed in, for example, a vehicle according to an embodiment of the invention.

FIG. 1 illustrates a block diagram showing an overall structure of a radar system 2 installed in, for example, a vehicle (own vehicle) VE according to an embodiment of the invention. Incidentally, the radar system according to the embodiment is served as, for example, assistance of the operation of an airbag system AR installed in the vehicle VE. In other words, the radar system 2 is configured as a pre-crash sensor.

As shown in FIG. 1, the radar system 2 according to the embodiment comprises a digital/analog (D/A) converter 10 for converting digital modulation data Dm into an analog modulation signal M, an oscillator 12 for frequency-modulate its oscillation frequency according to the modulation signal M generated by the D/A converter 10, thereby generating an extremely high frequency.

The radar system 2 comprises a divider 14 for electrically dividing the extremely high frequency signal into a transmission signal Ss and a local signal L, a transmission antenna 16 for transmitting radar wave signals according to the transmission signal Ss, and a receiving antenna 18 for receiving radar wave signals.

The radar system 2 comprises a mixer 20 for mixing each of the received radio wave signals Sr and the local signal L to generate beat signals B, an amplifier 22 for amplifying the beat signals B outputted from the mixer 20, and an analog/digital (A/D) converter 24 for sampling the amplified beat signals B to convert the amplified beat signals B into digital data Db.

The radar system 2 comprises a signal processing unit 26 for supplying the digital modulation data Dm to the D/A converter 10 and fetching the sampled data Db to execute signal processing to the fetched sampling data Db, thereby obtaining information related to the target from which the transmitted radar wave signals are reflected.

The signal processing unit 26 is configured as a known microcomputer having a CPU (Central Processing Unit), a ROM (Read Only Memory), a RAM (Random Access Memory) and an external storage unit so that they are communicable with each other. A computer-readable memory, such as a CD (compact disk), DVD (digital versatile disk) or the like can be set on the external storage unit 26a.

On the computer-readable memory, a program is installed. The program allows the signal processing unit 26 to execute the processings shown in FIG. 5 hereinafter.

The signal processing unit 26 comprises a processor, such as a DSP (Digital Signal Processor) that is communicable with the CPU and operative to execute signal processings including the Fast Fourier Transformation (FFT) on the fetched sampling data Db.

Figure 4:
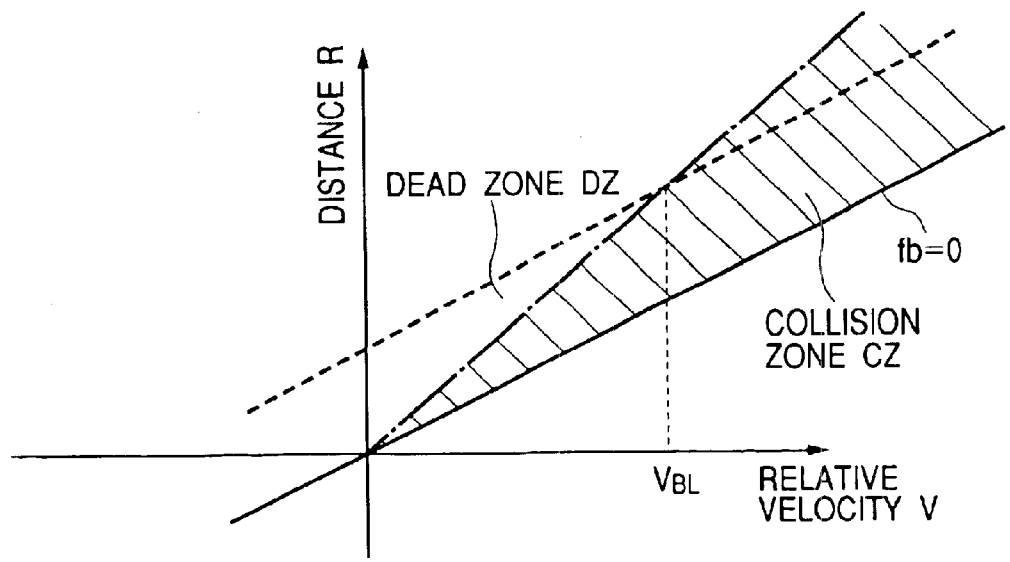
FIG. 4 is an explanation view showing a relationship between the dead zone and the collision zone shown in FIG. 3.

The signal processing unit 26 can execute processings that are shown in FIG. 4 hereinafter, on the basis of the program product loaded in the RAM from the external storage unit.

In the radar system 2 according to this embodiment, the D/A converter 10 generates the analog modulation signal M according to the digital modulation data Dm, and the oscillator generates the extremely high frequency signal that is frequency-modulated according to the modulation signal M. The divider 14 electrically divides the extremely high frequency signal into the transmission signal Ss and the local signal L so that the radio wave signals are transmitted through the transmission antenna 16 on the basis of the transmission signal Ss.

The radio wave signals that are reflected from, for example, a target TA, such as other vehicle, obstacles and the like, that exit around the own vehicle VE, are received by the receiving antennal 18, and the mixer 20 mixes the received radio wave signals Sr and the local signals L, respectively, to generate beat signals B. The beat signals B are amplified by the amplifier 22 and the amplified beat signals B are sampled by the A/D converter 24 so that the digital data Db is generated. The digital data Db is fetched by the signal processing unit 26.

As the analog modulation signal M, a signal that allows the oscillating frequency of the oscillator 12 to be modulated into a saw-tooth wave signal, oscillating frequency which corresponds to each frequency of each of the transmission signal Ss and the local signal L, and each frequency of each radio wave signal.

Figure 2:
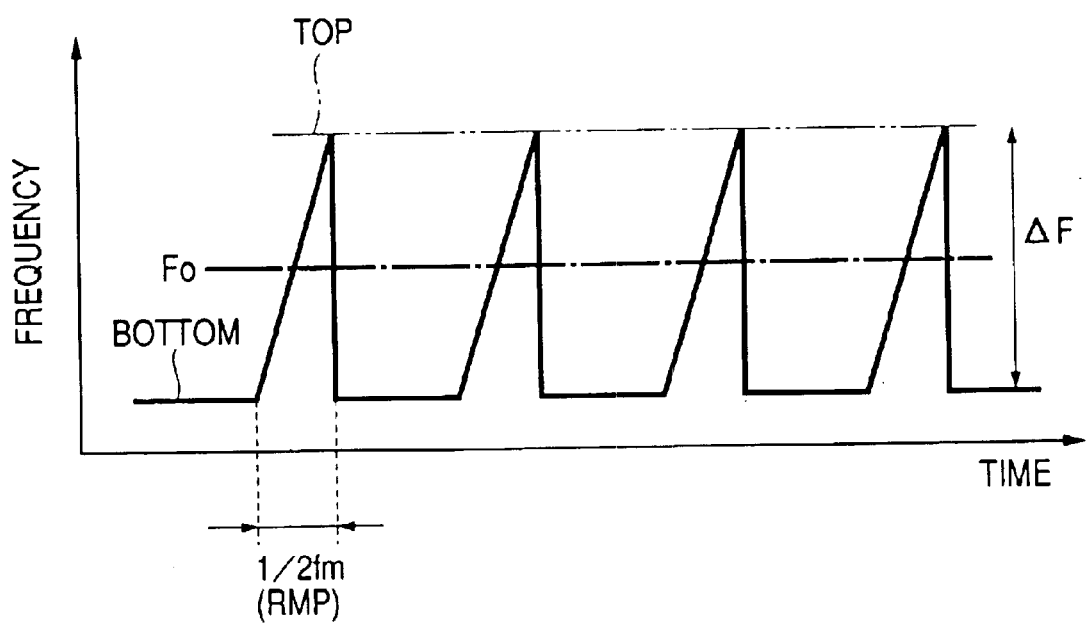
FIG. 2 is a view showing an waveform of frequency of a modulation signal with respect to time according to the embodiment.

Concretely, as shown in FIG. 2, the frequency of the modulation signal M periodically varies in time so that the frequency periodically increases gradually in time from the minimum value (bottom) and it reaches the maximum value (top) after the predetermined modulation period of 1/(2 fm), that is the rising modulation period RMP elapses from the leading edge of the frequency. The frequency modulation width representing the frequency between the maximum value (top) and the minimum value (bottom) of the modulation signal M is referred to as ΔF and the center frequency thereof is referred to as Fo.

That is, the transmission signal Ss, the local signal L and each radio wave signal are frequency-modulated according to the frequency modulation signal M so that each frequency of each of the transmission signal Ss, the local signal L and the radio wave signal periodically values in time like the saw-tooth wave signal as shown in FIG. 2.

Some of the waves that are transmitted from the transmission antenna 16 to be directly received by the receiving antenna 18 may cause low frequency noise components to occur in the beat signal B generated by the mixer 20. It is difficult to detect the peak frequency components in a frequency band of the beat signal B in which the low frequency noise components are included. A zone corresponding to the frequency band is referred to as "dead zone".

In addition, the predetermined zone defined by the predetermined values of distance R and those of relative velocity V between the own vehicle in which the radar system 2 is installed and the target around the vehicle causes the collisions between the own vehicle and the targets to be unavoidable. The predetermined zone is referred to as "collision zone".

The frequency bands corresponding to the dead zone and the collision zone are previously stored on the memory device of the signal processing unit 26, such as the ROM or the like.

Figure 3:
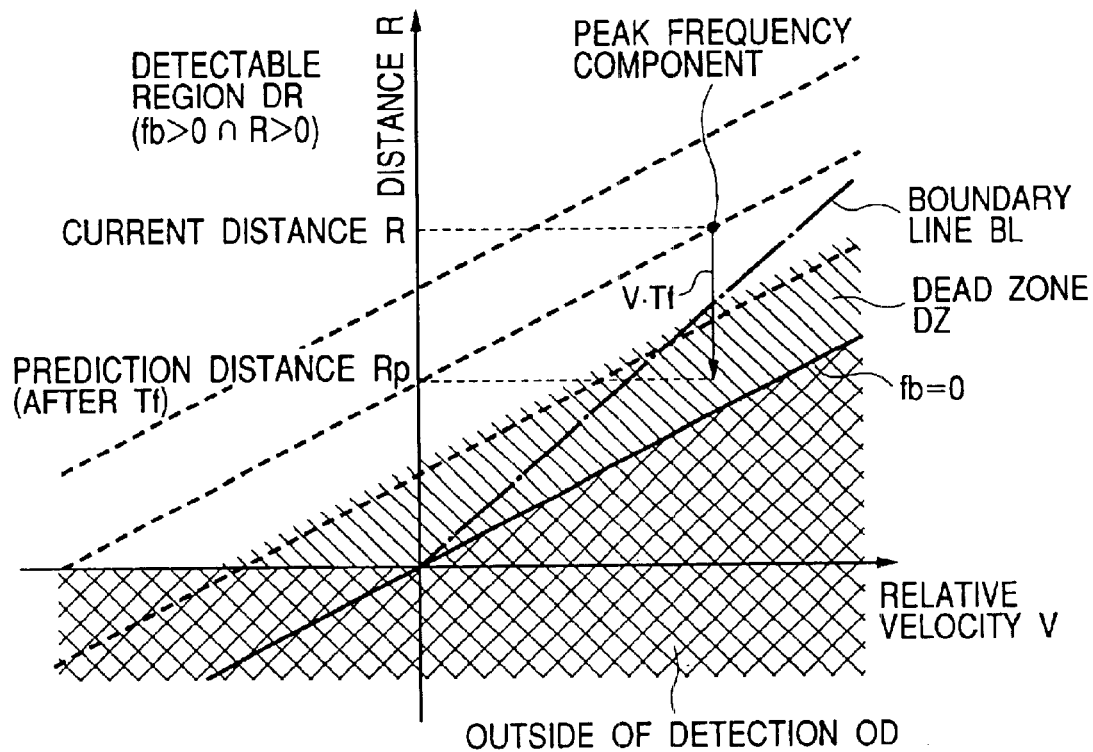
FIG. 3 is an explanation view showing a relationship among detected values of frequency of the beat signal, each of obtained values of distance and those of relative velocity between an own vehicle and a target according to the embodiment.

FIG. 3 is an explanation view showing a relationship among the detected values of frequency of the beat signal B, that is referred to as "beat frequency fb", each of the obtained values of distance R and those of relative velocity V between the own vehicle and the target. Incidentally, the values of distance R and those of the relative velocity V are positive when the target is oncoming to the vehicle. The dashed lines in FIG. 3 show that the values of beat frequency fb equal to each other.

In FIG. 3, the crossed-hatched region shows an outside of detection OD so that the values of beat frequency fb are less than zero or the values of distance R are also less than zero. Other region except for the outside of detection OD is the detectable region DR so that the values of beat frequency fb exceed zero and the values of distance R also exceed zero.

The solid line L shows that each value of beat signal B equals to zero. The diagonal hatched region represents the dead zone DZ.

As shown in FIG. 3, the dead zone DZ is independent of the values of distance R from the target and those of relative velocity V thereto so that the frequency band of dead zone DZ has the constant width in the line L.

In contrast, the more the relative velocity V increases, the more the boundary value of distance R at which the collision between the vehicle and the target will be unavoidable increases so that the frequency band of collision zone increases in proportion to the increase of the relative velocity V.

That is, FIGS. 3 and 4 show the boundary line BL, illustrated by single dashed line, of the collision zone CZ deciding whether the collision between the vehicle and the target will be unavoidable.

According to this embodiment, as shown in FIGS. 3 and 4, the boundary line BL clearly shows that, when the value of relative velocity V is smaller than the value $V_{BL}$ of the relative velocity V at which the boundary line BL and the top of the constant width of the dead zone DZ are crossed, the dead zone DZ is larger than the collision zone CZ.

In contrast, when the value of relative velocity V exceeds the value $V_{BL}$ of the relative velocity V, the collision zone CZ is larger than the dead zone DZ.

Then, the processings executed by the signal processing unit 26 will be explained in accordance with the flowchart shown in FIG. 5.

The signal processing unit 26 loads the program into the RAM to boot it, thereby executing the processings in accordance with the program.

Figure 5:
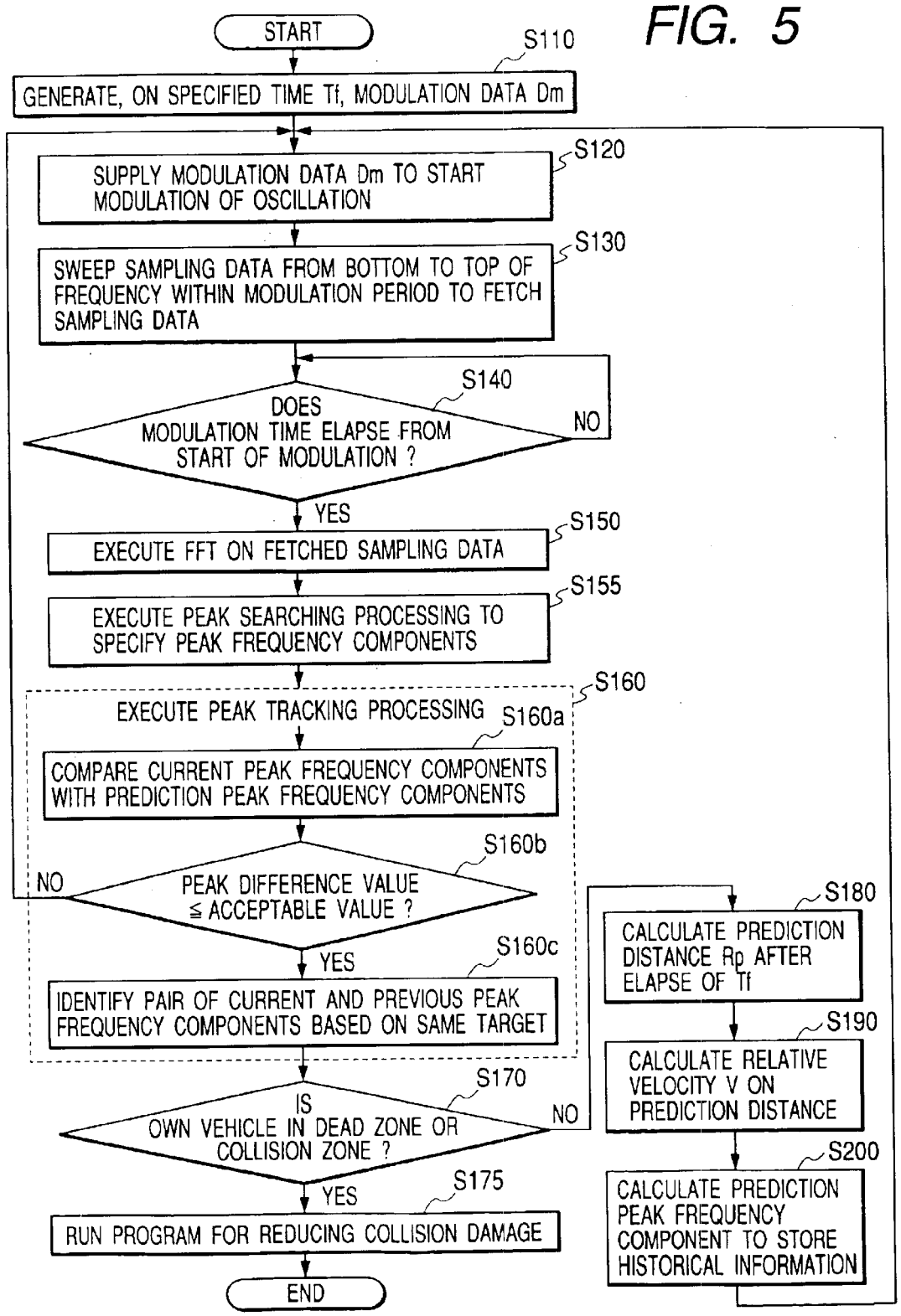
FIG. 5 is a flowchart showing processings of the signal processing unit shown in FIG. 1 according to the embodiment.

That is, the signal processing unit 26 generates, on the basis of previously specified time Tf of, for example 0.3 seconds, the modulation data Dm that is used for generating the modulation signal M (Step S110 in FIG. 5).

Concretely, as shown in FIG. 2, in Step S110, the signal processing unit 26 sets the modulation width (modulation range) ΔF and the modulation period of 1/(2 fm) so that the rate K of the frequency change of the radar wave signal with respect to time matches with the value of Fo/Tf in accordance with the equation (5):

$$2 \cdot fm \cdot \Delta F = \frac{F0}{Tf} = K \quad (5)$$

where the F0 represents the center frequency of the modulation range ΔF.

Incidentally, the rate K is referred to as "graduation K of modulation".

The signal processing unit 26, in Step S110, generates the modulation data Dm according to the set modulation range ΔF and the modulation time 1/(2 fm).

In Step S110, the signal processing unit 26 may change the values of modulation range ΔF and the modulation time 1/(2 fm), respectively, so as to match the graduation K of modulation with the Fo/Tf. In Step S110, the signal processing unit 26 may also keep unchanged one of the values of modulation range ΔF and the modulation time 1/(2 fm) and change other thereof, thereby matching the graduation K of modulation with the Fo/Tf.

The signal processing unit 26 supplies the modulation data Dm to the D/A converter 10 so as to make the D/A converter 10 and the oscillator 12 start the modulation of the oscillation frequency of the oscillator 12 every detection period DP according to the modulation data Dm (Step S120).

Incidentally, the detection period DP represents the period from the start timing of modulation to the next start timing thereof. It may be preferable that the detection period DP equal to or less than the specified time Tf, for example, the detection period DP may be set within the distance from approximately 10 to 30 ms (milliseconds).

That is, the analog modulation signal M is generated by the D/A converter 10 in each detection period DP according to the digital modulation data Dm, and the oscillation frequency of the oscillator 12 is frequency-modulated in each detection period DP according to the modulation signal M so that the extremely high frequency signal is periodically generated.

The extremely high frequency signal is periodically divided by the divider 14 into the transmission signal Ss and the local signal L so that the radio wave signals are periodically transmitted through the transmission antenna 16 on the basis of the transmission signal Ss.

The radio wave signals that are periodically reflected from at least the target TA are synthesized to be periodically received by the receiving antennal 18, and the synthesized radio wave signal Sr is periodically transmitted to the mixer 22. The radio waves Sr is periodically mixed with the local signals L so that the beat signal B is periodically generated.

The beat signal B that is amplified by the amplifier 22 is periodically sampled at a predetermined frequency by the A/D converter 24 so that the digital sampling data Db is periodically generated.

Figure 6:
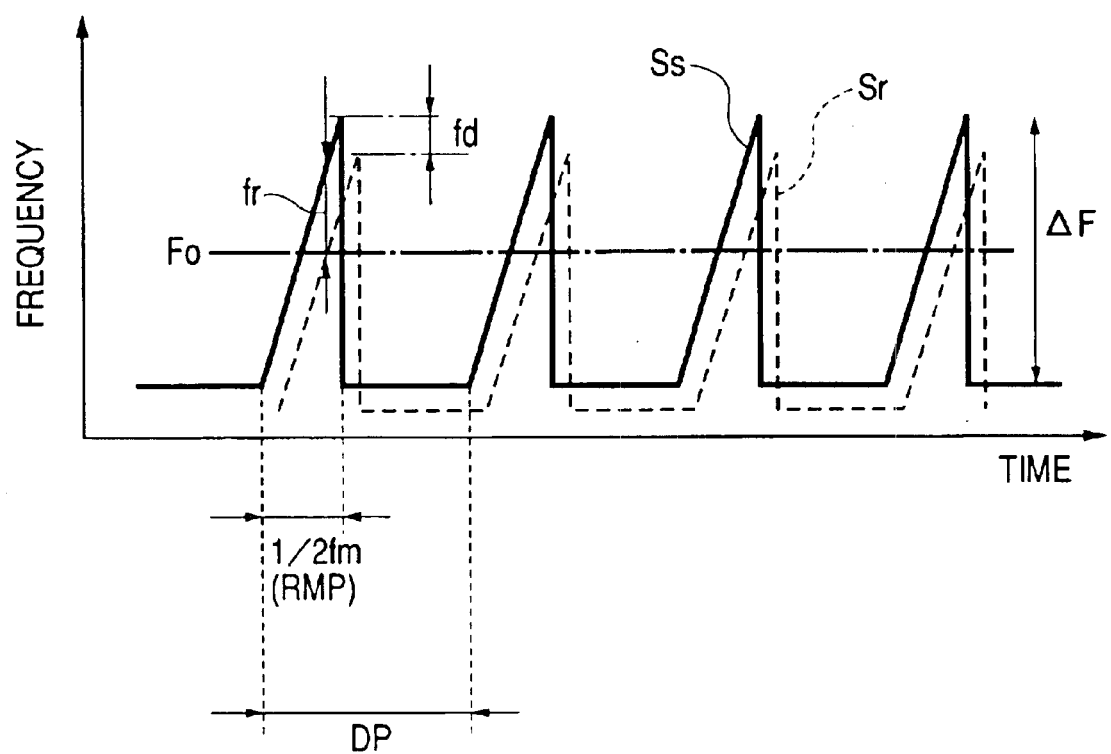
FIG. 6 is a view showing beat frequency fb (fr+fd) of the beat signal related to the transmission signal Ss and the reflection signal Sr according to the first embodiment.

Then, as shown in FIG. 6, in each detection period DP, the signal processing unit 26 sweeps the digital sampling data Db from, in this embodiment, the bottom of the frequency modulation range of the transmitted radar wave signal to the top thereof within the modulation period 1/(2·fm) so as to have repeatedly fetched the sampling data Db (Step S130), until the modulation time 1/(2 fm) elapses so that the modulation ends.

Here, as shown in FIG. 6, the frequency fr represents a delay frequency from which the radar wave signal Ss is transmitted to which the reflected signal Sr is received based on the radar wave signal Ss. That is the frequency fr corresponds to the frequency difference between the frequency of radar wave signal Ss and that of the reflected signal Sr.

Assuming that the relative velocity V between the target TA and the own vehicle VE is more than zero, the frequency of the reflected signal Sr shifts with respect to the frequency of the signal Ss in the decreasing (falling) direction by the Doppler frequency fd.

That is, the beat frequency fb is represented by the following equation (6):

$$fb = fr - fd = \frac{4 \cdot fm \cdot \Delta F \cdot R}{C} - fd = \frac{4 \cdot fm \cdot \Delta F \cdot R}{C} - \frac{2 \cdot F0 \cdot V}{C} \quad (6)$$

where the C represents velocity of light, the R represents a distance from the radar system 2 (own vehicle VE) to the target TA.

Incidentally, in the equation (6), the relative velocity V is positive when the target is oncoming to the own vehicle VE.

If the relative velocity V is positive when the target is coming away from the own vehicle VE, The beat frequency fb is represented by the following equation (6a):

$$fb = \frac{4 \cdot fm \cdot \Delta F \cdot R}{C} + \frac{2 \cdot F0 \cdot V}{C} \quad (6a)$$

In addition, in Step S130, while executing the processing, the signal processing unit 26 determines whether the modulation time 1/(2 fm) elapses from the start of modulation (Step S140).

If the determination of the processing in Step S140 is NO, that is, the modulation time 1/(2 fm) does not elapse from the start of modulation, the processing unit 26 returns to Step S130 to have executed the processings Steps S130 and S140.

If the determination of the processing in Step S140 is YES, that is, the modulation time 1/(2 fm) elapses from the start of modulation so that the modulation ends, the processing unit 26 executes the Fast Fourier Transformation (FFT) on the fetched sampling data Db of the beat signal B in each detection period DP to generate a frequency spectrum of the frequency fb of bead signal B (Step S150).

The signal processing unit 26, in each detection period DP, executes a peak searching processing to specify peak frequency components each of which has peak power of the frequency fb of beat signal B (Step S155), and executes a peak tracking processing for checking the continuity of each of the peak frequency components obtained in the current detection period and the peak historical information HI including each of the prediction peak frequency components obtained in Step S200 hereinafter in the previous detection period on the basis of the previous sampling data (Step S160).

That is, in Step S160, the signal processing unit 26 compares the peak frequency components currently obtained by the peak searching processing in the current detection period with the previously calculated prediction peak frequency components included in the peak history information HI in the previous detection period, respectively, (Step S160a), and determines whether at least one difference value (peak difference value) between at least one currently obtained peak frequency component and at least one previously obtained prediction peak frequency component equals to or less than the predetermined acceptable value according to the compared result (Step S160b).

When the signal processing unit 26 determines that no difference values between the currently obtained peak frequency components and the previously obtained prediction peak frequency components equal to or less than the predetermined acceptable value according to the compared result (the determination in Step S160b is NO), the signal processing unit 26 determines that the relationship between every currently obtained peak frequency component and every previously obtained prediction peak frequency component has no continuity, returning to the processing in Step S120.

When the signal processing unit 26 determines that at least one difference value between at least one currently obtained peak frequency component and at least one previously obtained prediction peak frequency component equals to or less than the predetermined acceptable value according to the compared result (the determination in Step S160b is YES), the signal processing unit 26 considers that the at least one currently obtained peak frequency component and at least one previously obtained prediction peak frequency component substantially match with each other so that the signal processing unit 26 determines that the relationship between the at least one currently obtained peak frequency component and the at least one previously obtained prediction peak frequency component has continuity, thereby identifying that the at least one pair of the at least one currently obtained peak frequency component and the at least one previously obtained prediction peak frequency component is based on the same target (S160c). That is, the signal processing unit 26 can sequentially detect the at least one peak frequency component from the same target in each of the previous detection period and the current detection period.

In this embodiment, for example, because the radio wave signals are reflected from at least the target TA so that the difference between the at least one pair of the at least one currently obtained peak frequency component and at least one previously obtained prediction peak frequency component that are obtained from the same target TA equals to or less than the predetermined acceptable value, the signal processing unit 26 identifies that the at least one pair of the at least one currently obtained peak frequency component and at least one previously obtained prediction peak frequency component is based on the same target TA.

Next, the signal processing unit 26 determines, in each detection period DP, whether the own vehicle VE has already been running on the collision zone CZ or the dead zone DZ according to the currently obtained peak frequency component of the at least one identified target, such as the target TA, and the historical information HI including the previously obtained relative velocity V (Step S170).

When determining that the own vehicle VE has already been running on the collision zone CZ or the dead zone DZ, that is, the determination in Step S170 is Yes, the signal processing unit 26 determines that the own vehicle VE is likely to collide with the at least one specified target, running a program for reducing collision (crash) damage. For example, the program makes operate the airbag system AR before crash, or other similar collision damage reducing units, thereby allowing an airbag to be blown up before crash (Step S175), the signal processing unit 26 ends the processings.

On the other hand, when determining that the own vehicle VE has not been running on the collision zone CZ or the dead zone DZ yet, that is, the determination in Step S170 is No, the signal processing unit 26 assumes that the current relative velocity V in the current detection period DP is kept approximately unchanged within the current detection period DP so that a prediction distance Rp from the own object to the at least one target after an elapse of the constant time Tf from a current positional relationship between the own vehicle VE and the at least one target TA can be represented as the distance (R−V·Tf). The R represents, as the positional relationship, the current distance between the own object VE and the at least one target (see FIG. 3).

That is, the signal processing unit 26 calculates the prediction distance Rp (=R−V·T) on the basis of the peak frequency component identified in the processing of Step S160 in accordance with the following equations (7) and (8) which hold between the peak frequency component and the prediction distance Rp:

$$fb = (R - V \cdot Tf) \cdot \frac{2}{C} \cdot \frac{F0}{Tf} \quad (7)$$

$$= \frac{2K}{C} \cdot Rp \quad (8)$$

where the K represents F0/Tf (Step S180).

Incidentally, substitution of the equation (6) into the equation (5) and arrangement of the substituted equation (6) allow the equation (7) to be obtained. When the target is coming away from the own vehicle, the relative velocity V is positive so that prediction distance Rp is represented as "R+V·Tf", allowing the beat frequency fb to be represented by the equation (7a):

$$fb = (R + V \cdot Tf) \cdot \frac{2}{C} \cdot \frac{F0}{Tf} \quad (7a)$$

Next, the signal processing unit 26 calculates the relative velocity V between the own vehicle VE and the at least one target (target TA) on the basis of the currently calculated prediction distance Rp and the previously calculated prediction distance Rp' in the previous detection period DP included in the historical information HI (Step S190). As the calculation, the signal processing unit 26 can use easily differential calculations that are known.

The signal processing unit 26 stores the prediction distance Rp and the relative velocity V on the external storage unit 26a as the historical information HI, and calculates the prediction peak frequency component in accordance with, for example the above (5) equation, that is used in the next detection period DP, thereby storing the calculated prediction peak frequency component on the external storage unit 26a as the historical information HI (Step S200), returns to the processing in Step S120.

That is, the signal processing unit 26 repeatedly executes the processings in Step S120 to Step S200 every detection period DP.

In addition, the historical information HI stored on the external storage unit 26a can be used for avoiding the collision of the own vehicle VE and the at least one target TA on the basis of the historical information HI.

For example, an annunciation unit installed in the own vehicle VE operates to announce an alert to draw driver's attention so as to avoid a collision of the own vehicle VE and the at least one target when it determines that the own vehicle VE is likely to collide with the at least one target in accordance with the historical information HI, for example, the prediction distance Rp that is positioned in the collision zone CZ. A swing unit installed in the own vehicle VE operates to swing the own vehicle VE by a predetermined angle so as to avoid the collision of the own vehicle VE and the at least one target when it determines that the own vehicle VE is likely to collide with the at least one target in accordance with the historical information HI, for example, the prediction distance Rp that is positioned in the collision zone CZ. A breaking unit installed in the own vehicle VE operates to brake the own vehicle VE so as to avoid the collision of the own vehicle VE and the at least one target when it determines that the own vehicle VE is likely to collide with the at least one target in accordance with the historical information HI, for example, the prediction distance Rp that is positioned in the collision zone CZ. An engine driving unit installed in the own vehicle VE operates to stop the drive of the engine so as to avoid the collision of the own vehicle VE and the at least one target in accordance with the historical information HI, for example, the prediction distance Rp that is positioned in the collision zone CZ.

When the above units determine that the collision is unavoidable according to the historical information HI, for example, the prediction distance Rp, the signal processing unit 26 runs the program for reducing collision (crash) damage, thereby making operate the airbag system AR before crash, or other similar collision damage reducing units, allowing an airbag to be blown up before crash (See Step S175).

As described above, the radar system 2 of this embodiment sweeps the digital sampling data Db from the bottom of the frequency of the transmitted radar wave signal to the top thereof within the modulation period $1/(2 \cdot fm)$ in which the frequency thereof only increases, thereby calculating the peak frequency components of the frequency fb of beat signal B on the basis of the fetched sampling data Db.

In addition, the radar system 2 of this embodiment compares the currently obtained peak frequency components with the previously obtained peak frequency components to identify the at least one peak frequency component from the same target without performing the pair-match processings, making it possible to reduce the amount of calculating required for detecting the at least one target.

The radar system 2 of this embodiment sweeps the digital sampling data Db from the bottom of the frequency of the transmitted radar wave signal to the top thereof within the modulation period $1/(2 \cdot fm)$, that corresponds to the rising modulation period in which the frequency thereof only increases (rises). The sweeping processing makes it possible to reduce the amount of time required for fetching the sampling data of the beat signal B by half compared with the conventional FMCW radars which fetch the frequency components of the beat signal within both of the rising modulation period (sweep time ST) in which the frequency of the radar signal increases and the falling modulation period (sweep time ST) in which the frequency of the radar signal decreases, allowing the processings in Step S120 to S200 to be repeatedly executed every short period of, for example, 10~30 ms. This enables the response of detecting the targets to be improved.

Still furthermore, the radar system 2 does not calculate the current distance R from the own vehicle VE to the at least one target at the current time but calculates the prediction distance Rp after an elapse of the constant time Tf from the current time, making it possible to predict in advance an abnormal oncoming of the at least one target to the own vehicle VE or the like on the basis of the prediction distance Rp. This prediction can immediately prevent the own vehicle from colliding with the at least one target and/or allows the airbag system to operate before collision in cases where the collision is unavoidable, thereby improving the certainty of the collide avoidance operations and/or the damage reducing operations and the safety of at least one occupants in the own vehicle VE. Incidentally, in this embodiment, the processing of the signal processing unit 26 in Step S110, the D/A converter 10 and the oscillator 12 correspond to a frequency-modulating unit, the antenna 16 corresponds to a transmitting unit, and the mixer 20 corresponds to a mixing unit. In addition, the receiving antenna 18 corresponds to a receiving unit, the processings of the signal processing unit 26 in Step S130 to Step S160 correspond to a sweeping unit, and the processing of the signal processing unit 26 in Step S180 corresponds to an obtaining unit.

This embodiment has been explained hereinbefore, but the present invention is not limited to the structure and is applicable to various modifications.

As one of the modifications, in this embodiment the radar system 2 is used as the pre-crash sensor, but the radar system 2 may be served as an FMCW radar for usual ACC (Adaptive Cruise Controls).

Figure 7:
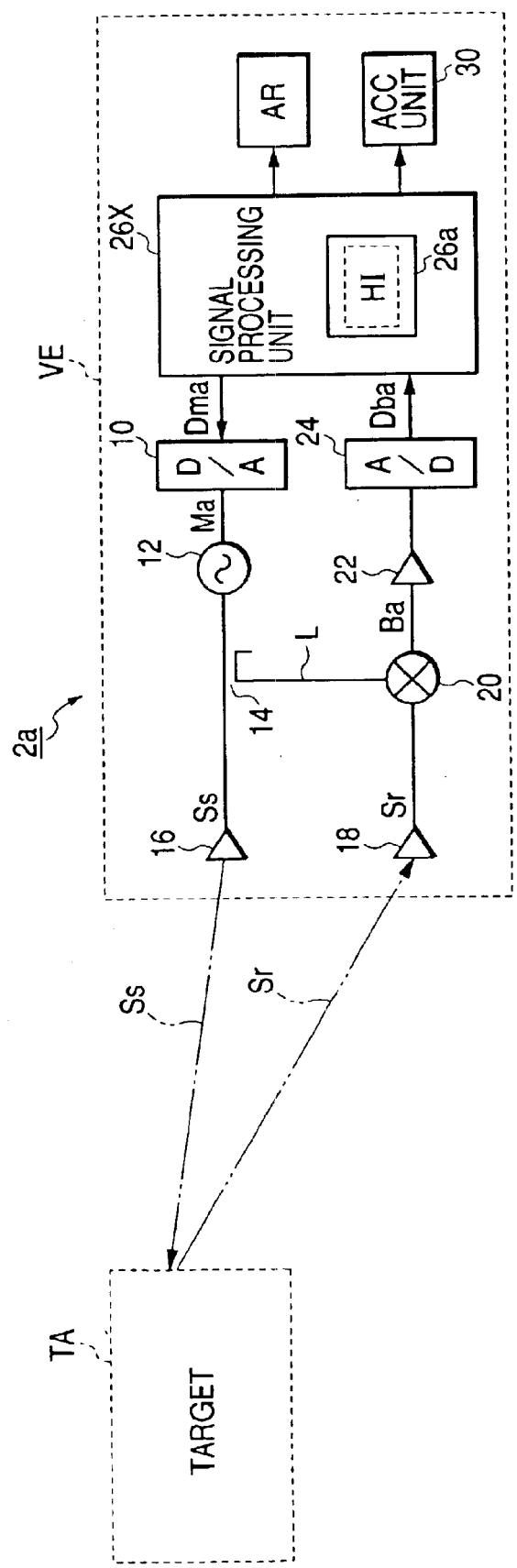
FIG. 7 is a view illustrating a block diagram showing an overall structure of a radar system installed in an own vehicle according to a modification of the invention.

FIG. 7 illustrates a block diagram showing an overall structure of a radar system 2a installed in an own vehicle VE according to a modification of the invention. In this modification, the radar system 2a further comprises, in addition to the structure of the radar system 2, an ACC unit 30 for automatically adjusting the velocity of the own vehicle VE in order to maintain a proper distance between the own vehicle VE and the at least one target (target TA). Other elements in FIG. 7 are substantially identical to those in FIG. 1 except for the signal processing unit 26X.

Figure 8:
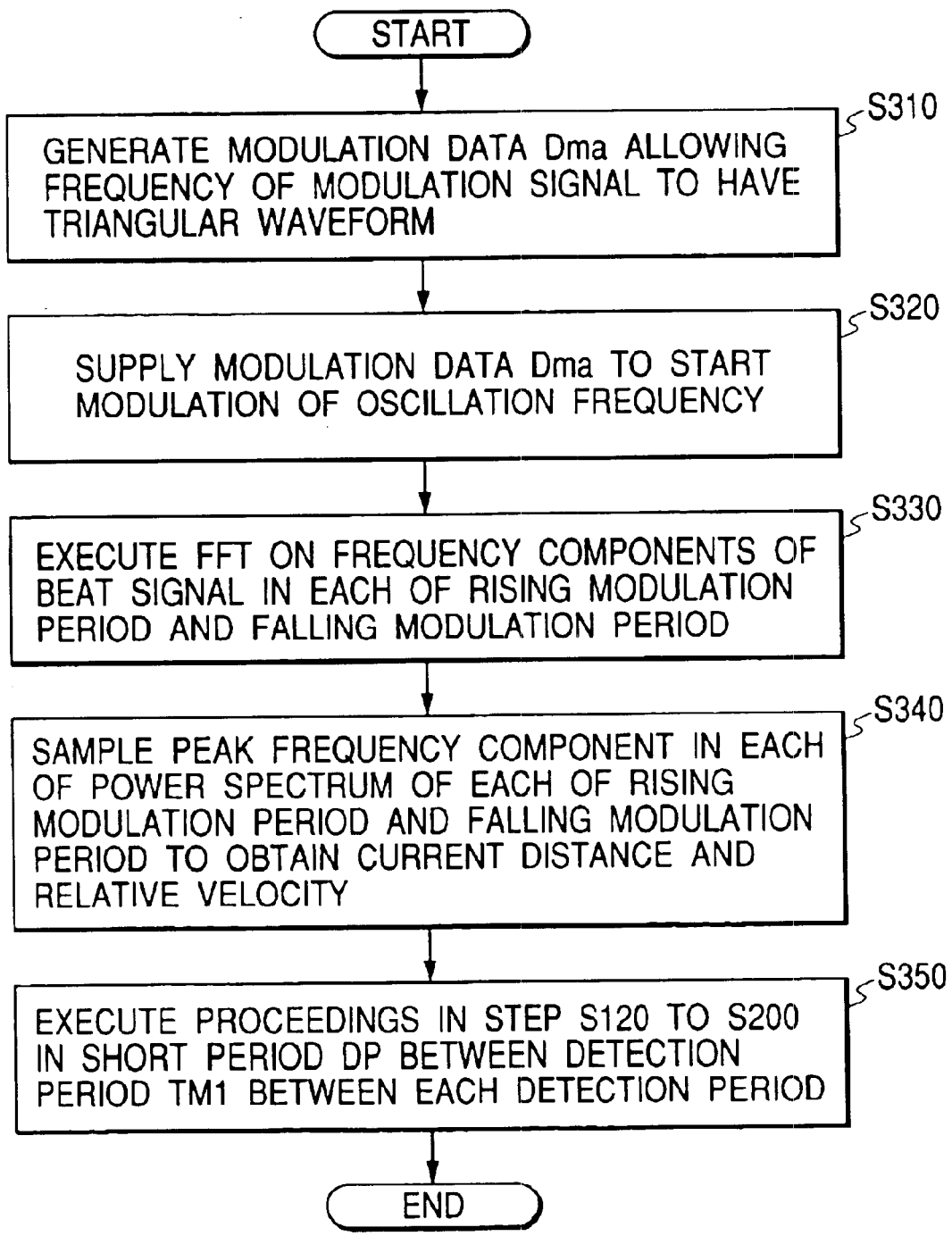
FIG. 8 is a flowchart showing processings of the signal processing unit shown in FIG. 7 according to the modification of the invention.

In this modification, the signal processing unit 26X corresponding to the signal processing unit 26 of the embodiment generates the modulation data Dm1 that allows the frequency of the modulation signal M1 to have a triangular waveform in time (Step S310 in FIG. 8), and supplies the modulation data Dm1 to the D/A converter 10 so as to make the D/A converter 10 and the oscillator 12 start the modulation of the oscillation frequency of the oscillator 12 every detection period $Tm1a(=1/fma)$ according to the modulation data Dma (Step S320).

Figure 9:
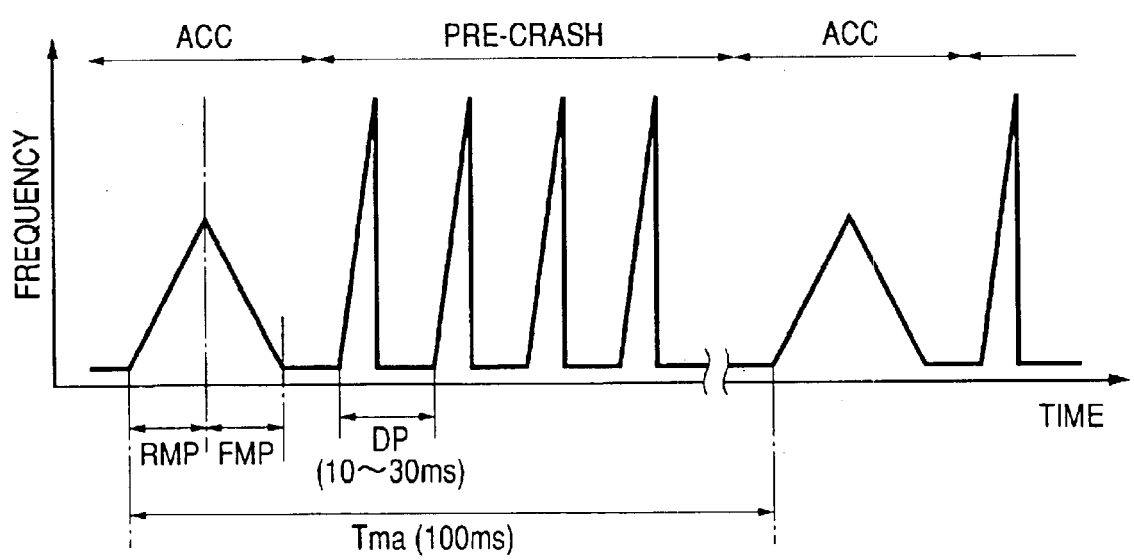
FIG. 9 is a view showing an waveform of frequency of a modulation signal with respect to time according to the modification of the invention.

When the sampling data Dba corresponding to the beat signal Ba based on the modulation signal M1 is generated by the A/D converter 24, the signal processing unit 26X, as shown in FIG. 9, executes, within each detection period Tma of 100 ms, the Fast Fourier Transformation (FFT) on the frequency components of the beat signal Ba that correspond to a rising modulation period RMP in which the frequency of the radar signal increases, and on other frequency components thereof that correspond to a falling modulation period FMP in which the frequency of the radar signal decreases (falls), thereby obtaining a power spectrum of the beat signal Ba in each of the rising and falling modulation periods (Step S330).

The signal processing unit 26X, within each detection period Tma of 100 ms, samples a peak frequency component in each of the power spectrums and combines the sampled peak frequency components to obtain a pair of peak frequency components, thereby obtaining a current distance Ra from the own vehicle VE to the at least one target and/or a current relative velocity V of the at least one target (Step S340). The obtained current distance R and the current relative velocity V are transmitted to the ACC unit 30, allowing the ACC unit 30 to automatically adjust the velocity of the own vehicle VE in order to maintain a proper distance between the own vehicle VE and the at least one target (target TA) on the basis of the transmitted current distance R and the current relative velocity V.

Between each detection period Tma, as shown in FIG. 9, the signal processing unit 26X executes the processings as the pre-crash sensor, that is, executes the processings in Step S120 to S200 in short period DP of, for example, 10~30 ms (Step S350).

The processings S310 to S350 are repeatedly executed every detection period Tm1 of 100 ms.

That is, when the radar system 2a is used as an FMCW radar for ACC, the radar system 2a needs to exactly detect a distance and a relative velocity between the own vehicle on which the radar system 2a is installed and the at least one target. When the radar system 2a is served as the FMCW sensor, however, the radar system 2a aims at the at least one target that is positioned comparatively far from the own vehicle VE about 5 to 150 m, allowing the detection period Tm1 to be comparatively long.

In contrast, when the radar system 2a is alternately used as the radar system 2 for pre-crash sensor and/or for collision avoidance, the radar system 2a aims at the at least one target that is positioned comparatively close to the own vehicle VE about 0 to 5 m so that it is necessary to detect the at least one target every detection period as short as possible.

Moreover, the radar systems 2 and 2a related to the embodiment and the modification of the invention are installed in the vehicle, but the present invention is not limited to the applications.

That is, the radar system 2 (the radar system 2a) may be installed in a mobile object.

Furthermore, each of the radar systems 2 and 2a related to the embodiment and the modification of the invention, sweeps the digital sampling data Db from the bottom of the frequency of the transmitted radar wave signal to the top thereof within the modulation period $1/(2\cdot fm)$, that is, the rising modulation period in which the frequency thereof only increases (rises). However, the present invention is not limited to the structure.

Figure 10:
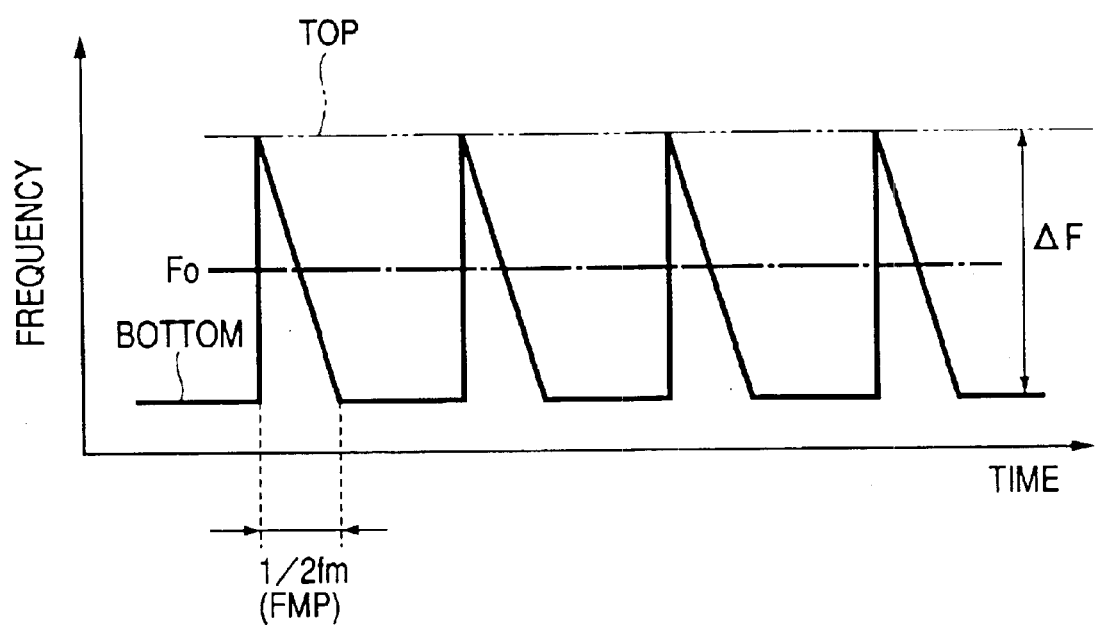
FIG. 10 is a view showing an waveform of frequency of a modulation signal with respect to time according to another modification of the embodiment.
Figure 11:
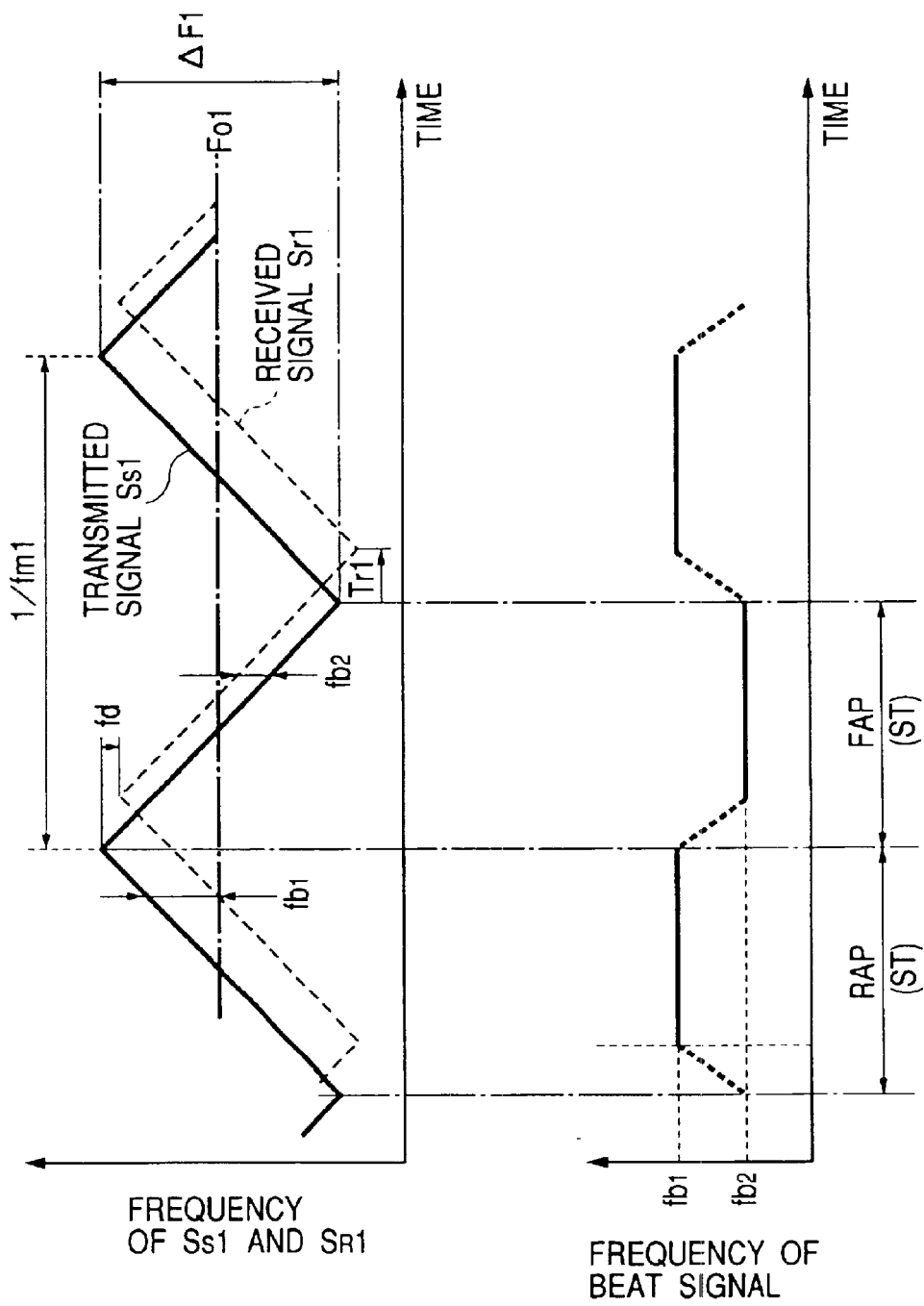
FIG. 11 is a view explaining operations of an FMCW radar.

That is, as shown in FIG. 10, each of the radar systems 2 and 2a may sweep the digital sampling data Db from the top of the frequency of the transmitted radar wave signal to the bottom thereof within the modulation period $1/(2\cdot fm)$, that is, the falling modulation period in which the frequency thereof only decreases (falls).

In this case, the beat frequency fb may be represented by the following equation (9):

$$fb = fr + fd = \frac{4 \cdot fm \cdot \Delta F \cdot R}{C} + fd = \frac{4 \cdot fm \cdot \Delta F \cdot R}{C} + \frac{2 \cdot F0 \cdot V}{C} \quad (9)$$

Incidentally, in the equation (9), the relative velocity V is positive when the target is oncoming to the own vehicle VE.

If the relative velocity V is positive when the target is coming away from the own vehicle VE, the beat frequency fb is represented by the following equation (9a):

$$fb = \frac{4 \cdot fm \cdot \Delta F \cdot R}{C} - \frac{2 \cdot F0 \cdot V}{C} \quad (9a)$$

While there has been described what is at present considered to be the embodiment and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2002-311386 filed on Oct. 15, 2002 so that the contents of which are incorporated herein by reference.

What is claimed is:

1. A method of calculating a prediction distance from a reference object to a target after predetermined constant time from a current state that the reference object and the target have a positional relationship therebetween, said method comprising:

frequency-modulating a radar wave signal within a predetermined frequency modulation range so that a frequency of the frequency modulated radar ware changes in time, a rate of frequency change of said radar wave signal in time being set to F0/Tf, said F0 representing a center frequency in the frequency modulation range, said Tf representing the predetermined constant time;

mixing the frequency-modulated radar wave signal transmitted from the reference object and a reflection signal to obtain a beat signal, said reflection signal being based on the transmitted radar wave signal reflected from the target, said beat signal being based on a frequency difference between a frequency of the transmitted radar wave signal and that of the reflection signal;

sweeping the beat signal within the frequency modulation range from on of the bottom of the frequency modulation range and the top of the frequency modulation range to the other thereof to obtain a frequency component of the beat signal; and obtaining the prediction distance based on the frequency component of the beat signal.

2. The method according to claim 1, wherein the prediction distance is obtained according to an equation of the form:

$$fb = \frac{2K}{C} \cdot Rp$$

where the Rp represents the prediction distance, the fb represents the frequency component of the beat signal, and the C represents the velocity of light.

3. The method according to claim 1, wherein said sweeping step sweeps the beat signal within the frequency modulation range from one of the bottom of the frequency modulation range and the top of the frequency modulation range to the other thereof every predetermined period to obtain the frequency component of the beat signal every predetermined period, and wherein said obtaining step is repeated for predetermined periods, further comprising calculating a relative velocity between the reference object and the target according to the prediction distances for respective adjacent predetermined periods.

4. The method according to claim 3, wherein the adjacent predetermined periods include at least a previous predetermined period and a current predetermined period, further comprising:

calculating a prediction frequency component in the current predetermined period according to a previous prediction distance obtained in the previous predetermined period and the relative velocity calculated in the previous predetermined period; and comparing the calculated prediction frequency component in the current predetermined period with the obtained frequency component therein to determine whether the relationship between the previous frequency component obtained in the previous predetermined period and the current frequency component obtained in the current predetermined period has continuity according to the compared result.

5. The method according to claim 3, wherein said reference object is a vehicle, further comprising:

storing thereon information related to a dead zone and a collision zone, said dead zone being a frequency band of the beat signal in which it is difficult to detect the frequency component due to a low frequency noise component included in the frequency band, said collision zone being defined by a predetermined distance between the vehicle and the target and a predetermined relative velocity therebetween and causing a collision between the vehicle and the target to be unavoidable; and determining whether the vehicle has already been positioned in the dead zone or the collision zone according to the stored information, the obtained frequency component and the calculated relative velocity between the reference object and the target.

6. The method according to claim 1, wherein said reference object is a vehicle in which a collision avoidance unit and a collision damage reducing unit are installed, further comprising:

determining whether the vehicle will collide with the target according to the prediction distance;

when determining that the vehicle will collide with the target according to the prediction distance, operating the collision avoidance unit to avoid the collision of the vehicle with the target; and when determining that the collision of the vehicle with the target is unavoidable, operating the collision damage reducing unit to reduce the damage of collision.

7. A method of calculating a current distance from a reference object to a target, and a prediction distance from the reference object to the target after predetermined constant time from a current state that the reference object and the target have the current distance, said method comprising:

first frequency-modulating a first radar wave signal so that a frequency of the frequency-modulated first radar wave alternately increases and decreases in time;

first mixing the frequency-modulated first radar wave signal transmitted from the reference object and a first reflection signal to obtain a first beat signal, said first reflection signal being based on the transmitted first radar wave signal reflected from the target, said first beat signal being based on a frequency difference between a frequency of the transmitted first radar wave signal and that of the first reflection signal;

first sweeping the first beat signal within a rising modulation period in which the frequency of the first radar signal increases and within a falling modulation period in which the frequency thereof decreases, respectively, to obtain a pair of frequency components of the first beat signal corresponding to each of the rising modulation period and the falling modulation period;

first obtaining the current distance based on the pair of frequency components of the beat signal;

second frequency-modulating a second radar wave signal within a predetermined frequency modulation range so that a frequency of the frequency-modulated second radar wave changes in time, a rate of frequency change of said second radar wave signal in time being set to F0/Tf, said F0 representing a center frequency in the frequency modulation range, said Tf representing the predetermined constant time;

second mixing the frequency-modulated second radar wave signal transmitted from the reference object and a second reflection signal to obtain a second beat signal, said second reflection signal being based on the transmitted second radar wave signal reflected from the target, said second beat signal being based on a frequency difference between a frequency of the transmitted second radar wave signal and that of the second reflection signal;

second sweeping the second beat signal within the frequency modulation range from one of the bottom of the frequency modulation range and the top of the frequency modulation range to the other thereof to obtain a frequency component of the second beat signal; and second obtaining the prediction distance based on the frequency component of the second beat signal.

8. The method according to claim 7, wherein said first sweeping step sweeps the first beat signal within the rising modulation period and the falling modulation period every first predetermined period to obtain pair of frequency components of the first beat signal every predetermined period, said first obtaining step obtains the current distance based on the pair of frequency components of the first beat signal every first predetermined period, said second sweeping step sweeps the second beat signal within the frequency modulation range from one of the bottom of the frequency modulation range and the top the frequency modulation range to the other thereof every second predetermined period to obtain the frequency component of the second beat signal every second predetermined period, and wherein said second obtaining step is repeated for second predetermined periods, each of said second predetermined periods being included within each of said first predetermined period.

9. A system for calculating a prediction distance from the own system to a target after predetermined constant time from a current state that the town system and the target have a positional relationship therebetween, said system comprising:

a frequency-modulating unit configured to frequency-modulate a radar wave signal within a predetermined frequency modulation range so that a frequency of the frequency-modulated radar wave changes in time, a rate of frequency change of said radar wave signal in time being set to F0/Tf, said F0 representing a center frequency in the frequency modulation range, said Tf representing the predetermined constant time;

a transmitting unit configured to transmit the frequency-modulated radar wave signal;

a receiving unit configured to receive a reflection signal, said reflection signal being based on the transmitted radar wave signal reflected from the target;

a mixing unit configured to mix the transmitted frequency-modulated radar wave signal and the reflection signal to obtain a beat signal, said beat signal being based on a frequency difference between a frequency of the transmitted radar wave signal and that of the reflection signal;

a sweeping unit configured to sweep the beat signal within the frequency modulation range from one of the bottom of the frequency modulation range and the top of the frequency modulation range to the other thereof to obtain a frequency component of the beat signal; and an obtaining unit configured to obtain the prediction distance based on the frequency component of the beat signal.

10. The system according to claim 9, wherein the prediction distance is obtained according to an equation of the form:

$$fb = \frac{2K}{C} \cdot Rp$$

where the Rp represents the prediction distance, the fb represents the frequency component of the beat signal, and the C represents the velocity of light.

11. The system according claim 9, wherein said sweeping unit is configured to sweep the beat signal within the frequency modulation range from one of the bottom of the frequency modulation range and the top of the frequency modulation range to the other thereof every predetermined period to obtain the frequency component of the beat signal every predetermined period, and wherein said obtaining unit is configured to obtain the prediction distance for predetermined periods, further comprising a first calculating unit configured to calculate a relative velocity between the own system and the target according to the prediction distances for respective adjacent predetermined periods.

12. The system according to claim 11, wherein the adjacent predetermined periods include at least a previous predetermined period and a current predetermined period, further comprising:

a second calculating unit configured to calculate a prediction frequency component in the current predetermined period according to a previous prediction distance obtained in the previous predetermined period and the relative velocity calculated in the previous predetermined period; and a comparing unit configured to compare the calculated prediction frequency component in the current predetermined period with the obtained frequency component therein to determine whether the relationship between the previous frequency component obtained in the previous predetermined period and the current frequency component obtained in the current predetermined period has continuity according to the compared result.

13. The system according to claim 9, wherein said own system is installed in a vehicle in which a collision avoidance unit and a collision damage reducing unit are installed, further comprising:

a determining unit configured to determine whether the vehicle will collide with the target according to the prediction distance;

when determining that the vehicle will collide with target according to the prediction distance, a first operating unit configured to operate the collision avoidance unit to avoid the collision of the vehicle with the target; and when determining that the collision of the vehicle with the target is unavoidable, a second operating unit configured to operate the collision damage reducing unit to reduce the damage of collision.

14. The system according to claim 9, wherein said own system is installed in a vehicle, further comprising:

a storing unit configure to store information related to a dead zone and collision zone, said dead zone being a frequency band of the beat signal in which it is difficult to detect the frequency component due to a low frequency noise component included in the frequency band, said collision zone being defined by a predetermined distance between the vehicle and the target and a predetermined relative velocity therebetween and causing a collision between the vehicle and the target to be unavoidable; and a determining unit configured to determine whether the vehicle has already been positioned in the dead zone or the collision zone according to the stored information, the obtained frequency component and the calculated relative velocity between the reference object and the target.

15. A system for calculating a current distance from the own system to a target, and a prediction distance from the own system to the target after predetermined constant time from a current state that the own system and the target have the current distance, said system comprising:

a first frequency-modulating unit configured to frequency-modulate a first radar wave signal so that a frequency of the frequency-modulated first radar wave alternately increases and decreases in time;

a first transmitting unit configured to transmit the frequency-modulated first radar wave signal;

a first receiving unit configured to receive a first reflection signal, said first reflection signal being based on the transmitted first radar wave signal reflect from the target;

a first mixing unit configured to mix the transmitted frequency-modulated first radar wave signal and the first reflection signal to obtain a first beat signal, said first beat signal being based on a frequency difference between a frequency of the transmitted first radar wave signal and that of the first reflection signal;

a first sweeping unit configured to sweep the first beat signal within a rising modulation period in which the frequency of the first radar signal increases and within a falling modulation period in which the frequency thereof decreases, respectively, to obtain a pair of frequency components of the first beat signal corresponding to each of the rising modulation period and the falling modulation period;

a first obtaining unit configured to obtain the current distance based on the pair of frequency components of the beat signal;

a second frequency-modulating unit configured to frequency-modulate a second radar wave signal within a predetermined frequency modulation range so that a frequency of the frequency-modulated second radar wave changes in time, a rate of frequency change of said second radar wave signal in time being set to F0/Tf, said F0 representing a center frequency in the frequency modulation range, said Tf representing the predetermined constant time;

a second transmitting unit configured to transmit the frequency-modulated second radar wave signal;

a second receiving unit configured to receive a second reflection signal, said second reflection signal being based on the transmitted second radar wave signal reflected from the target;

a second mixing unit configured to mix the transmitted frequency-modulated second radar wave signal and the second reflection signal to obtain a second beat signal, said second beat signal being based on a frequency difference between a frequency of the transmitted second radar wave signal and that of the second reflection signal;

a second sweeping unit configured to sweep the second beat signal the frequency modulation range from one of the bottom of the frequency modulation range and the top of the frequency modulation range to the other thereof to obtain a frequency component of the second beat signal; and a second obtaining unit configured to obtain the prediction distance base on the frequency component of the second beat signal.

16. The system according to claim 15, wherein said first sweeping unit is configured to sweep the first beat signal within the rising modulation period and the falling modulation period every first predetermined period to obtain the pair of frequency components of the first beat signal every predetermined period, said first obtaining unit is configured to obtain the current distance based on the pair of frequency components of the first beat signal every first predetermined period, said second sweeping unit sweeps the second beat signal within the frequency modulation range from one of the bottom of the frequency modulation range and the top of the frequency modulation range to the other thereof every second predetermined period to obtain the frequency component of the second beat signal every second predetermined period, and wherein said second obtaining unit obtains the prediction distance for second predetermined periods, each of said second predetermined periods being included within each of said first predetermined period.

17. A computer-readable medium encoded with a computer program product comprising instructions being executed by a signal processing unit for calculating a prediction distance from a reference object to a target after predetermined constant time from a current state that the reference object and the target have a positional relationship therebetween, in which said signal processing unit is installed in the reference object and is communicable with a frequency-modulating unit installed in the reference object, said instructions comprising:

means for causing the signal processing unit to control the frequency-modulating unit so that the frequency-modulating unit frequency-modulates a radar wave signal within a predetermined frequency modulation range so that a frequency of the frequency-modulated radar wave changes in time, a rate of frequency change of said radar wave signal in time being set to F0/Tf, said F0 representing a center frequency in the frequency modulation range, said Tf representing the predetermined constant time;

when the frequency-modulated radar wave signal transmitted from the reference object and reflected from the target is received as a reflection signal, and the reflection signal is mixed with the transmitted radar wave signal to obtain a beat signal that is based on a frequency difference between a frequency of the transmitted radar wave signal and that of the reflection signal, means for causing the signal processing unit to sweep the beat signal within the frequency modulation range from one of the bottom of the frequency modulation range and the top of the frequency modulation range to the other thereof to obtain a frequency component of the beat signal; and means for causing the signal processing unit to obtain the prediction distance based on the frequency component of the beat signal.

\* \* \* \* \*